United States Patent
Hobel

(10) Patent No.: US 10,347,054 B2
(45) Date of Patent: Jul. 9, 2019

(54) METHOD AND SYSTEM FOR PROVIDING VEHICLE DATA OF A MOTOR VEHICLE

(71) Applicant: Audi AG, Ingolstadt (DE)

(72) Inventor: Christoph Hobel, Karlsfeld (DE)

(73) Assignee: AUDI AG, Ingolstadt (DE)

( * ) Notice: Subject to any disclaimer, the term of this patent is extended or adjusted under 35 U.S.C. 154(b) by 94 days.

(21) Appl. No.: 15/229,508

(22) Filed: Aug. 5, 2016

(65) Prior Publication Data

US 2017/0039783 A1 Feb. 9, 2017

(30) Foreign Application Priority Data

Aug. 5, 2015 (DE) .................. 10 2015 010 204

(51) Int. Cl.
*G07C 5/00* (2006.01)
*G01C 21/34* (2006.01)
(Continued)

(52) U.S. Cl.
CPC ......... *G07C 5/008* (2013.01); *G01C 21/3469* (2013.01); *G01C 21/3691* (2013.01);
(Continued)

(58) Field of Classification Search
CPC .... G07C 5/008; H04W 64/006; H04W 4/046; H04L 67/42; H04L 67/125; G01C 21/3469; G01C 21/3691; H04B 17/318
See application file for complete search history.

(56) References Cited

U.S. PATENT DOCUMENTS 6,988,034 B1 * 1/2006 Marlatt .................. G06Q 10/02
 701/468
9,581,453 B2 2/2017 Lacher
(Continued)

FOREIGN PATENT DOCUMENTS

DE 102011118706 A1 5/2013
DE 102012024869 A1 5/2014
(Continued)

OTHER PUBLICATIONS

English-language abstract of German Patent Application Publication No. 10 2012 024 869 A1, published Jun. 26, 2014; 1 page.
(Continued)

*Primary Examiner* — Rodney A Butler
(74) *Attorney, Agent, or Firm* — Sterne, Kessler, Goldstein & Fox P.L.L.C.

(57) ABSTRACT

The present disclosure concerns a system and method with the steps: detecting of the signal strength of a mobile radio connection between the motor vehicle and a mobile radio network at detected positions of the motor vehicle after determining from the detected signal strength that the mobile radio connection has been interrupted and the motor vehicle has been parked as of this time within a predetermined duration: storing of the position of the motor vehicle in which the motor vehicle was situated at the time of the interruption as a dead spot; relaying of vehicle data to a vehicle-external server device as soon as it is determined, after the storing of the dead spot, that the motor vehicle has approached within a given distance of the stored dead spot; providing of the relayed vehicle data by the vehicle-external server device.

18 Claims, 1 Drawing Sheet

(51) Int. Cl.
*G01C 21/36* (2006.01)
*H04W 4/04* (2009.01)
*H04B 17/318* (2015.01)
*H04L 29/06* (2006.01)
*H04W 64/00* (2009.01)
*H04L 29/08* (2006.01)

(52) U.S. Cl.
CPC .......... *H04B 17/318* (2015.01); *H04L 67/42* (2013.01); *H04W 4/046* (2013.01); *H04W 64/006* (2013.01); *H04L 67/125* (2013.01)

(56) References Cited

U.S. PATENT DOCUMENTS

| | | | |
|---|---|---|---|
| 2010/0240346 A1* | 9/2010 | Jain | H04W 4/02 455/414.1 |
| 2011/0167128 A1 | 7/2011 | Raghunathan et al. | |
| 2013/0334373 A1* | 12/2013 | Malone, Jr. | B61L 23/044 246/2 R |
| 2014/0187235 A1* | 7/2014 | Cai | H04W 24/10 455/422.1 |
| 2014/0254543 A1 | 9/2014 | Engelhard et al. | |
| 2016/0025497 A1* | 1/2016 | Baalu | G01C 21/005 701/430 |
| 2016/0044129 A1* | 2/2016 | Bergmann | H04L 67/2847 455/406 |
| 2016/0093216 A1* | 3/2016 | Lee | H04W 4/046 340/870.11 |
| 2016/0334239 A1* | 11/2016 | Cho | G09B 29/106 |
| 2017/0366930 A1* | 12/2017 | Treman | G01C 21/3679 |

FOREIGN PATENT DOCUMENTS

| | | |
|---|---|---|
| DE | 102013210246 A1 | 12/2014 |
| DE | 102013013329 A1 | 2/2015 |

OTHER PUBLICATIONS

English-language abstract of German Patent Application Publication No. 10 2013 210 246 A1, published Dec. 4, 2014.; 1 page.

\* cited by examiner

METHOD AND SYSTEM FOR PROVIDING VEHICLE DATA OF A MOTOR VEHICLE

CROSS REFERENCE TO RELATED APPLICATIONS

This application claims the benefit of German Patent Application Serial No. 10 2015 010 204.4, filed Aug. 5, 2015, which is incorporated herein by reference in its entirety.

TECHNICAL FIELD

The present disclosure concerns a method and a system for providing vehicle data of a motor vehicle.

BACKGROUND

In a modern motor vehicle, options are being increasingly provided for relaying vehicle data of the motor vehicle wirelessly to server devices outside the vehicle, so that a driver of the motor vehicle can access the vehicle data when he is not present in the motor vehicle. For example, such vehicle data is transmitted via a mobile radio link from the motor vehicle to a server device provided for this purpose outside the vehicle as soon as the motor vehicle is parked.

The network coverage of a mobile radio network can vary greatly depending on the parking place of the motor vehicle, so that it may occur that the vehicle data can no longer be transmitted from the motor vehicle to the vehicle-external server device when the motor vehicle has been parked in a parking place without network coverage.

US 2010/0240346 A1 shows a method of predicting radio dead spots for wireless vehicle applications. Information is provided as to dead spots of a mobile radio network. Using this information, a determination is made for an assumed route of the motor vehicle when the vehicle will arrive at one of these dead spots according to the assumed route. A wireless data transmission for a vehicle application is carried out such that it is terminated before the vehicle arrives at the particular dead spot.

DE 10 2011 118 706 A1 shows a method for transmitting data between a mobile terminal device situated in a motor vehicle and at least one stationary data network. A geo database is provided, in which historical values of radio interface parameters are stored for a plurality of locations and for predetermined dates. From this, estimated values are ascertained for future data transmissions. An estimated route of travel of the motor vehicle is determined. If a control unit discovers that an estimated parking position of the motor vehicle is located in a radio dead spot, the control unit provides information to a data service during the trip with the motor vehicle as to where the motor vehicle is expected to be parked at the end of the trip and when the motor vehicle will arrive there. In this way, it is possible to ensure that the vehicle position can also be called up from the data network via the data service even if the motor vehicle should be parked in the radio dead spot.

DE 10 2012 024 869 A1 shows a method for optimizing a mobile radio application of a motor vehicle. By a communication device, the network coverage is ascertained in advance for at least one route segment of a driving route of the motor vehicle. This should prevent the occurrence of a sudden loss of the connection.

What all of the procedures known from the aforementioned prior art have in common is that a particular driving route of a motor vehicle has to be known or at least estimated in order to ensure the providing of vehicle data of the respective motor vehicle through a mobile radio connection. If the driving route should be changed or if the estimated driving route is wrong, it may happen that vehicle data cannot be transmitted and provided across a mobile radio connection.

Therefore, the problem which the present disclosure proposes to solve is to provide a method and a system by means of which the vehicle data can be provided via a mobile radio connection in an especially reliable manner.

BRIEF DESCRIPTION OF THE DRAWINGS/FIGURES

DETAILED DESCRIPTION

Figure 1:
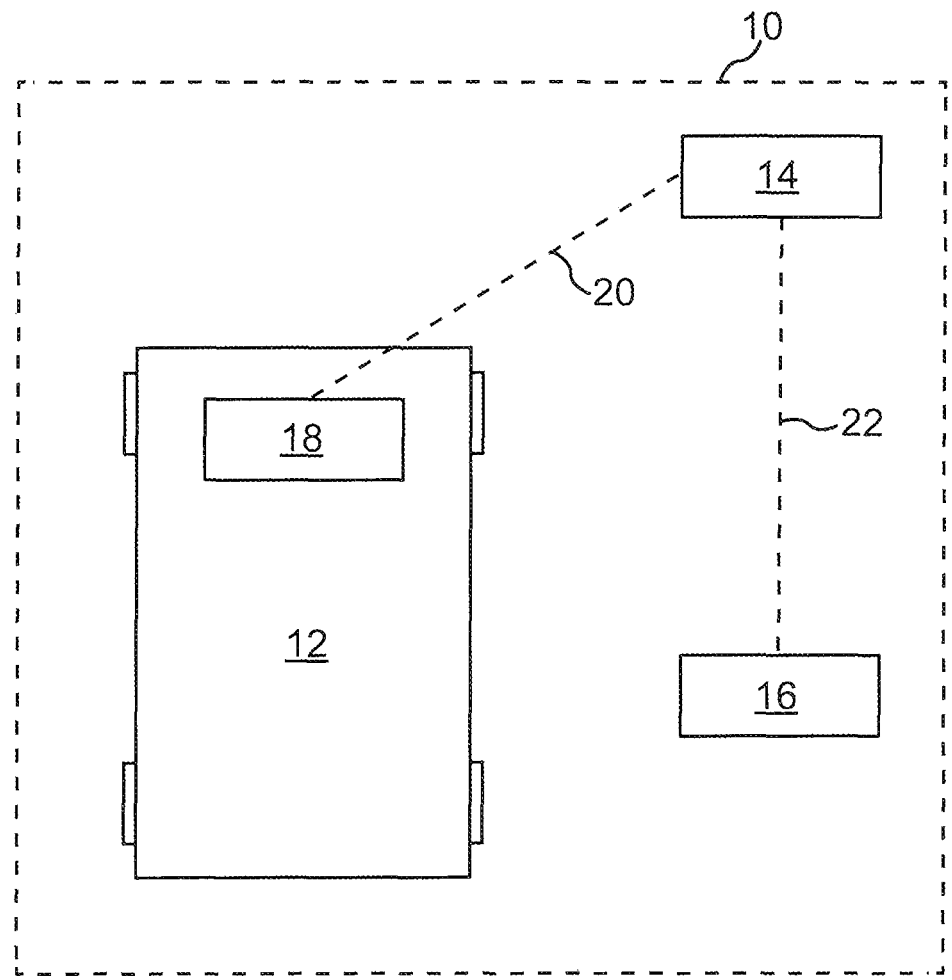
FIG. 1 illustrates a schematic representation of a system for providing vehicle data of a motor vehicle in accordance with embodiments of the present disclosure.

This problem is solved by a method as well as by a system for providing of vehicle data of a motor vehicle. Advantageous configurations with advisable and nontrivial modifications of the method and system are indicated in the below description.

In the method, the signal strength of a mobile radio connection between a motor vehicle and a mobile radio network at each detected position of the motor vehicle is detected by means of a control device of the motor vehicle. As soon as it is ascertained from the detected signal strength that the mobile radio connection has been interrupted and the motor vehicle has been parked as of this time within a predetermined duration, the position of the motor vehicle in which the motor vehicle was situated at the time of the interruption of the mobile radio connection is saved by means of the control device as a dead spot. After the saving of the dead spot, as soon as it is determined that the motor vehicle in a new trip has approached to within a given distance of the memorized dead spot, predetermined vehicle data of the motor vehicle is transmitted by means of the control device to a server device external to the vehicle via the mobile radio connection. The transmitted vehicle data is then provided by means of the vehicle-external server device.

The mobile radio connection can be, for example, a GSM mobile radio connection within a GSM mobile radio network. GSM stands for Global System for Mobile Communications, being a standard for fully digital mobile radio networks, which is chiefly used for telephony, but also for circuit-switched and packet-switched data transmissions as well as text messages. In theory, it can be any kind of mobile radio connection.

Thus, according to the present disclosure, there is a monitoring of the locations without mobile radio connection at which the motor vehicle is parked. For example, during the daily trip to work a future predictability of a bad reception at these parking positions can be prognosticated by memorizing these locations. Thus, for example, upon approaching an underground garage where a driver of the motor vehicle usually parks at regular intervals, even before reaching the underground garage—and thus before the mobile radio connection is broken—the control device can initiate and perform a transmission of the predetermined vehicle data to the vehicle-external server device via the mobile radio connection still existing at this time. Thus, even if the motor vehicle is parked at a memorized dead spot, a driver of the vehicle or also another user can access the vehicle data transmitted to the vehicle-external server device before reaching the dead spot.

For this, the signal strength of the mobile radio connection between the motor vehicle and the mobile radio network is continuously detected at each detected position of the motor vehicle by means of the control device of the motor vehicle. As soon as the signal to the mobile radio network, i.e., the mobile radio connection, is broken off and the vehicle after this time is parked within a predetermined duration, these positions are marked as dead spots. As soon as the vehicle during later trips approaches one of these dead spots to within a predetermined perimeter, for example 1 km, the predetermined vehicle data of the motor vehicle is transmitted by means of the control device via the mobile radio connection to the vehicle-external server device. If, now, after the parking of the motor vehicle, no more current vehicle data can be transmitted by the mobile radio connection to the vehicle-external server device, the data last transmitted to the vehicle-external server device can be provided.

Thus, with the method according to the present disclosure it is no longer necessary to know or estimate possible driving routes of the motor vehicle. Instead, by the method according to the present disclosure, without knowing the driving route or routes of the motor vehicle, a very reliable predictability of interruptions in a mobile radio connection between the motor vehicle and a mobile radio network at the most diverse parking positions of the motor vehicle is made possible.

The predetermined duration within which the motor vehicle needs to be parked after interruption of the mobile radio connection can be established, for example, with the help of a continuously detected parking behavior of the driver or drivers of the motor vehicle. Furthermore, the predetermined distance from the memorized dead spot or the memorized dead spots at which the early relaying of the predetermined vehicle data occurs can depend on how large is the volume of data being transmitted and/or on the bandwidth of the mobile radio connection in the vicinity of the memorized dead spots.

In an advantageous configuration of the present disclosure, the vehicle data relayed is at least the position of the motor vehicle at which the motor vehicle has approached to within the predetermined distance from the dead spot. Furthermore, however, it is also possible to transmit other data as the vehicle data to the vehicle-external server device, such as the fill level of the vehicle's gas tank, the charge state of the vehicle's battery, and the like. Thus, a driver of the motor vehicle or other authorized persons by access to the vehicle-external server device can access the vehicle data which was relayed to the vehicle-external server device shortly before reaching the radio dead spot, even when the motor vehicle is parked in a radio dead spot. In this way, an especially high currency of the retrieved vehicle data can be assured. In particular, a driver of the motor vehicle can locate relatively accurately the position of the motor vehicle even if the motor vehicle should be parked, for example, in an underground garage in which no mobile radio connection exists. Because in this case the last relayed position of the motor vehicle at which the motor vehicle approached the dead spot to within the predetermined distance can be, for example, the entry zone of the underground garage.

Another advantageous embodiment of the present disclosure calls for the vehicle data provided by means of the vehicle-external server device to be transmitted to a mobile communication device. For example, a driver of the motor vehicle can have installed a corresponding application, usually called an app, on his smartplaone, by means of which he can retrieve the vehicle data from the vehicle-external server device through a mobile radio connection. In particular, when there is no direct transmission or direct retrieval of the vehicle data by means of the smartphone from the motor vehicle, because it happens to be parked in a radio dead spot, it is still possible to retrieve the relatively current vehicle data from the vehicle-external server device.

According to another advantageous embodiment of the present disclosure, if at the time of the ascertained interruption of the mobile radio connection no satellite-based signal is available for determining the position of the motor vehicle, the position of the motor vehicle is determined with the aid of a previously available satellite-based signal and an odometer of the motor vehicle. For example, if the motor vehicle is in the vicinity of an entrance of an underground garage where only an inadequate or no satellite-based signal is available for determining the position of the motor vehicle, it is still possible to determine the position of the motor vehicle especially precisely in this way. For this, it is possible to use, for example, a satellite-based signal which was still exact enough to determine the position of the motor vehicle several meters ago. Starting from this position and in combination with the odometer of the motor vehicle, the exact position of the motor vehicle can then still be determined, for example, in an entrance zone of an underground garage.

Another advantageous embodiment of the present disclosure calls for the dead spot to be erased whenever the memorized dead spot is approached again by means of the motor vehicle and it is determined that a mobile radio connection exists at this dead spot. For example, if on account of a network expansion a mobile radio connection of the motor vehicle with a mobile radio network is possible afterwards at the memorized dead spot, the previously memorized dead spot will be erased. For example, it might be that the driver has parked his motor vehicle each day at a particular parking place where, until recently, there was not yet any mobile radio connection to the mobile radio network. If a new mobile radio tower has been built in the vicinity, this may have the consequence that a mobile radio connection can now be established with the mobile radio network at said parking place. In such a case, the previously memorized dead spot is then erased, so that a current data basis is always present in regard to radio dead spots. This can reduce needless early data transmittals to the vehicle-external server device.

Another advantageous embodiment of the present disclosure calls for the memorized dead spot to be erased once it is determined that the memorized dead spot has no longer been driven to within a predetermined number of trips with the motor vehicle. For example, it might be that the driver of the motor vehicle has changed jobs. While previously he always parked in a particular underground garage of his former job site on work days, he will no longer do so in the future. In such a case, it makes sense to erase the corresponding dead spot once more, since it is very unlikely that the driver of the motor vehicle will again drive to this dead spot and park his vehicle there. In other words, memorized dead spots are erased once again as soon as it is determined that these dead spots have no longer been driven to after a certain number of driving cycles. This can likewise prevent needless transmittal of vehicle data to the vehicle-external server device upon approaching these no longer relevant dead spots.

According to another advantageous embodiment of the present disclosure, in order to determine whether the motor vehicle has been parked, a check is made to see whether the ignition of the motor vehicle has been deactivated. By this simple means it can be determined whether the vehicle is actually parked or only just stopped for a brief time.

The system according to the present disclosure comprises a vehicle-external server device as well as at least one motor vehicle with a control device. The control device is designed to detect the signal strength of a mobile radio connection between the motor vehicle and a mobile radio network at each detected position of the motor vehicle. Furthermore, the control device is designed, as soon as it is determined by means of the detected signal strength that the mobile radio connection has been interrupted and the motor vehicle has been parked within a predetermined duration from this time on, to store as a dead spot the position of the motor vehicle at which the motor vehicle was situated at the time of the interruption of the mobile radio connection. Moreover, the control device is designed to relay predetermined vehicle data of the motor vehicle to the vehicle-external server device via the mobile radio connection once it is determined, after the memorizing of the dead spot, that the motor vehicle during a new trip has approached to within a predetermined distance of the memorized dead spot. The vehicle-external server device is designed to provide the relayed vehicle data. Advantageous configurations of the method according to the present disclosure are to be regarded as advantageous configurations of the system, wherein the system in particular has means of carrying out the steps of the method.

Further advantages, features and details of the present disclosure will emerge from the following description of preferred sample embodiments as well as the drawing. The features and combinations of features mentioned above in the specification, as well as the features shown by themselves or in combinations in the following description of the figures and/or in the figures, can be used not only in the particular indicated combination, but also in other combinations or standing alone, without leaving the scope of the present disclosure.

Figure 2:
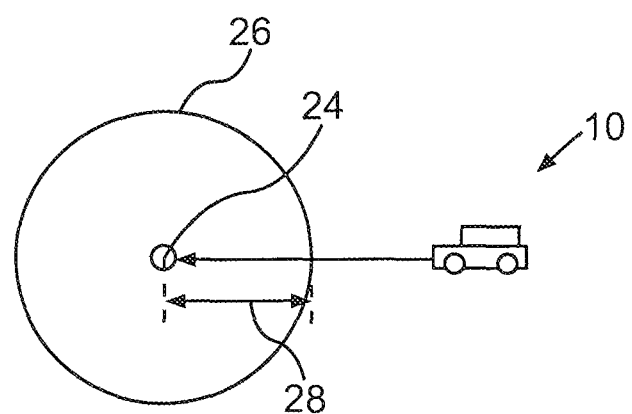
FIG. 2 illustrates a schematic representation of the motor vehicle as it approaches a dead spot corresponding to a radio dead spot within a mobile radio network.

The drawing shows:

FIG. 1 illustrates a schematic representation of a system for the providing of vehicle data of a motor vehicle, wherein the system has a vehicle-external server device, at least one motor vehicle and a mobile communication device; and FIG. 2 illustrates a schematic representation of the motor vehicle as it approaches a dead spot corresponding to a radio dead spot within a mobile radio network.

A system 10 for the providing of vehicle data of a motor vehicle is shown in a schematic representation in FIG. 1. The system 10 comprises at least one motor vehicle 12, a vehicle-external server device 14 as well as a mobile communication device 16, which can be for example a smartphone. The motor vehicle 12 furthermore comprises a control device 18. The control device 18 is designed to detect the signal strength of a mobile radio connection 20 between the motor vehicle 12 and a mobile radio network at each detected position of the motor vehicle 12.

The motor vehicle 12 can have, for example, a communications module, not shown here, by means of which the mobile radio connection 20 to the mobile radio network, such as a GSM mobile radio network, can be established and maintained, as long as the network coverage of the mobile radio network allows this. Furthermore, the motor vehicle 12 can also have, for determining the position of the motor vehicle 12, a position detection device, not shown here, which works for example on a satellite basis, and furthermore it can also have for example an odometer. By means of the odometer, it is possible to still determine with relative accuracy the position of the motor vehicle 12 when satellite signals are temporarily unavailable. The position detection device and said communications module can be coupled by computer technology to the control device 18, so that the control device 18 can detect ongoing the signal strength of the mobile radio connection 20 of the motor vehicle 12, more precisely that of the communications module, at each detected position of the motor vehicle 12.

The control device 18 is furthermore designed, once it has been determined by means of the detected signal strength that the mobile radio connection 20 has been interrupted and the motor vehicle 12 has been parked within a given duration as of this time on, to store the position of the motor vehicle 12 in which the motor vehicle 12 was situated at the time of the interruption of the mobile radio connection as a dead spot. Moreover, the control device 18 is designed to relay predetermined vehicle data of the motor vehicle 12 to the vehicle-external server device 14 via the mobile radio connection 20 as soon as it is determined, after the storing of the dead spot, that the motor vehicle 12 during a new trip has approached to within a predetermined distance of the memorized dead spot. The vehicle-external server device 14 is designed to provide the relayed vehicle data, so that it can be retrieved, for example also via a mobile radio connection 22 by means of the mobile communication device 16.

A method for the operation of the system 10 will be explained more closely below. Whenever the motor vehicle 12 is moving, the signal strength of the mobile radio connection 20 between the motor vehicle 12 and the mobile radio network at each detected position of the motor vehicle 12 is detected by means of the control device 18. Once it is determined by means of the detected signal strength that the mobile radio connection 20 has been interrupted and the motor vehicle 12 has been parked as of this time within a predetermined duration, the corresponding position of the motor vehicle 12 in which the motor vehicle 12 was situated at the time of the interruption of the mobile radio connection 20 is stored as a dead spot by means of the control device 18.

Thus, whenever the driver of the motor vehicle 12 should drive to a location where no mobile radio connection 20 exists any longer between the motor vehicle 12 and the mobile radio network, and thus also no connection is possible between the control device 18 and the vehicle-external server device 14 via the mobile radio connection 20, this position will be stored as a dead spot, as long as it has been detected, after driving to the dead spot, that the motor vehicle 12 was then parked.

Thus, with increasing time, a kind of digital map is gradually constructed with a plurality of dead spots where the driver of the motor vehicle 12 usually parks the motor vehicle 12 and no mobile radio connection 20 exists between the motor vehicle 12 and the mobile radio network. In order to decide whether the motor vehicle 12 has also in fact been parked after detecting a radio dead spot, a check is made to see whether the ignition of the motor vehicle 12 has been deactivated. In this way, it can be determined in an especially simple and reliable manner whether the motor vehicle 12 has been parked.

If the motor vehicle 12 during a drive should approach to within a predetermined distance of an already stored dead spot, predetermined vehicle data of the motor vehicle 12 will be relayed as a precaution to the vehicle-external server device 14 via the mobile radio connection 20 by means of the control device 18. For whenever the motor vehicle 12 approaches one of the stored dead spots, it is relatively likely that the motor vehicle 12 will also soon be parked where no mobile radio connection 20 exists any longer. As the vehicle data, it is possible to transmit, for example, the position of the motor vehicle 12, but also other data, such as the level of the gas tank, the charge status of the battery, and the like, to the vehicle-external server device 14. Thus, if the motor vehicle 12 is parked regularly in an underground garage in which no mobile radio connection 20 can be established between the motor vehicle 12 and the server device 14, the driver of the motor vehicle 12 can still access relatively current vehicle data, since this has been relayed shortly before reaching the underground garage to the vehicle-external server device 14.

FIG. 2 shows schematically one of these mentioned dead spots 24.

Furthermore, a perimeter 26 around the dead spot 24 is shown schematically. Thus, as soon as the motor vehicle 12 lands in this perimeter 26, it crosses the mentioned predetermined distance 28 from the dead spot 24 shown here schematically. Once the motor vehicle 12 drives into the perimeter 26, the predetermined vehicle data is transmitted by means of the control device 18 via the mobile radio connection 20 to the vehicle-external server device 14.

Previously stored dead spots 24 are erased once more as soon as these dead spots 24 are again driven to by means of the motor vehicle 12 and it is ascertained that a mobile radio connection 20 exists at this dead spot 24. For example, it may happen on account of a network expansion that, at certain positions where formerly in the past no mobile radio connection 20 was present, a mobile radio connection 20 can be established at these positions. In this case, it makes sense to erase the affected stored dead spots 24.

The stored dead spots 24 will likewise he erased once it is ascertained that the respective dead spots 24 have no longer been driven to for a predetermined number of trips with the motor vehicle 12. Alternatively or in addition, it is also possible to erase corresponding dead spots 24 which were previously stored once it is ascertained that these dead spots 24 have no longer been driven to with the motor vehicle 12 within a predetermined period of time after the storing of the particular dead spots 24.

For example, it might be the case when the driver of the motor vehicle 12 has changed jobs. While previously he always parked in a particular underground garage of his former job site, he will no longer do so in future. If the driver of the motor vehicle 12 after the job change should go to the vicinity of the underground garage, it is unlikely that he will also park his motor vehicle 12 there. Accordingly, a dead spot 24 corresponding to this underground garage is also no longer relevant and can be erased.

Thus, by means of the method and system 10 according to the present disclosure it is possible to detect the repeated parking of the motor vehicle 12 at certain locations without mobile radio connection 20 and promptly relay the vehicle data to the vehicle-external server device 14 before the motor vehicle 12 is parked in radio dead spots. This can make sure that a driver of the motor vehicle 12 in particular can retrieve relevant and current vehicle data via the vehicle-external server 14 even if he has parked his motor vehicle 12 in a radio dead spot.

What is claimed is:

1. A method for providing vehicle data of a motor vehicle comprising:

detecting a signal strength of a mobile radio connection between the motor vehicle and a mobile radio network at a detected position of the motor vehicle;

after determining that the mobile radio connection has been interrupted based on the signal strength and that the motor vehicle has been parked within a predetermined duration of time after the interruption of the mobile radio connection, storing the detected position of the motor vehicle as a dead spot in a memory; and after storing the dead spot in the memory, relaying the vehicle data to a vehicle-external server via the mobile radio network responsive to the motor vehicle approaching within a given distance of the dead spot, wherein the vehicle data comprises a position of the motor vehicle when the motor vehicle approaches within the given distance of the dead spot.

2. The method of claim 1, wherein the vehicle-related data is transmitted to a mobile communication device by the vehicle-external server.

3. The method of claim 1, further comprising:
determining the detected position of the motor vehicle using a satellite-signal and an odometer of the motor vehicle.

4. The method of claim 1, further comprising:
erasing the dead spot from the memory after connecting to the mobile radio network at the dead spot.

5. The method of claim 1, further comprising:
erasing the dead spot from the memory based on the motor vehicle having not been driven to the dead spot within a predetermined number of trips with the motor vehicle.

6. The method of claim 1, further comprising:
determining that the motor vehicle has been parked within the predetermined duration of time after the interruption of the mobile radio connection based on whether an ignition of the motor vehicle is deactivated.

7. The method of claim 1, further comprising:
determining the given distance of the dead spot based on a size of the vehicle data.

8. The method of claim 1, wherein the vehicle data includes a fill level of a gas tank of the motor vehicle or a charge state of a battery of the motor vehicle.

9. A system for providing vehicle data of a motor vehicle comprising:

a control device configured to communicate with a vehicle-external server; and at least one motor vehicle configured to:

detect a signal strength of a mobile radio connection between the motor vehicle and a mobile radio network at a detected position of the motor vehicle;

after determining that the mobile radio connection has been interrupted based on the signal strength and that the motor vehicle has been parked within a predetermined duration of time after the interruption of the mobile radio connection, store the detected position of the motor vehicle as a dead spot in a memory; and after storing the dead spot in the memory, relay the vehicle data to the vehicle-external server via the mobile radio network responsive to the motor vehicle approaching within a given distance of the dead spot, wherein the vehicle data includes a position of the motor vehicle when the motor vehicle approaches within the given distance of the dead spot.

10. The system of claim 9, wherein the vehicle-related data is transmitted to a mobile communication device by the vehicle-external server.

11. The system of claim 9, wherein the at least one motor vehicle is further configured to:
    determine the detected position of the motor vehicle using a satellite-signal and an odometer of the motor vehicle.

12. The system of claim 9, wherein the at least one motor vehicle is further configured to:
    erase the dead spot from the memory after connecting to the mobile radio network at the dead spot.

13. The system of claim 9, wherein the at least one motor vehicle is further configured to:
    erase the dead spot from the memory based on the motor vehicle having not been driven to the dead spot within a predetermined number of trips with the motor vehicle.

14. The system of claim 9, wherein the at least one motor vehicle is further configured to:
    determine that the motor vehicle has been parked within the predetermined duration of time after the interruption of the mobile radio connection based on whether an ignition of the motor vehicle is deactivated.

15. The system of claim 9, wherein the at least one motor vehicle is further configured to:
    determine the given distance of the dead spot based on a size of the vehicle data.

16. The system of claim 9, wherein the vehicle data includes a fill level of a gas tank of the motor vehicle or a charge state of a battery of the motor vehicle.

17. A method for providing vehicle data of a motor vehicle comprising:
    detecting an interruption of a mobile radio connection between the motor vehicle and a mobile radio network based on a signal strength of the mobile radio connection at a detected position of the motor vehicle;
    storing the detected position of the motor vehicle as a dead spot based on detecting that the motor vehicle has been parked within a predetermined duration of time after the interruption of the mobile radio connection; and
    after storing the dead spot, relaying the vehicle data to a vehicle-external server via the mobile radio network responsive to the motor vehicle approaching within a given distance of the dead spot, wherein the vehicle data includes a position of the motor vehicle when the motor vehicle approaches within the given distance of the dead spot.

18. The method of claim 17, wherein the vehicle-related data is transmitted to a mobile communication device by the vehicle-external server.

* * * * *